April 25, 1961     T. G. LINDBERG     2,981,003
AIMING DEVICE FOR CAMERAS AND THE LIKE
Filed Aug. 24, 1959

INVENTOR.
TORSTEN GUNNAR LINDBERG
BY
Linton and Linton
ATTORNEYS

United States Patent Office 2,981,003
Patented Apr. 25, 1961

2,981,003

AIMING DEVICE FOR CAMERAS AND THE LIKE

Torsten Gunnar Lindberg, Goteborg, Sweden, assignor to Fritz Victor Hasselblad, Goteborg, Sweden Filed Aug. 24, 1959, Ser. No. 835,597

Claims priority, application Sweden Aug. 27, 1958

1 Claim. (Cl. 33—46)

The present invention relates to aiming devices for cameras and the like which comprise two sighting holes spaced from each other and disposed in substantially parallel planes at right-angles to the line of sight.

The invention has for its object to provide an aiming device of the kind above referred to by means of which the correct aiming position is easily detected by the eye, and is mainly characterised in that one of the sighting holes is filled by a light-polarizing film and the second hole is surrounded by a light-polarizing film having a direction of polarization which is substantially perpendicular to the polarizing direction of the first-mentioned film.

According to the invention the last-mentioned sighting hole of the two is preferably arranged to be situated nearer to the eye when the device is used. According to one embodiment of the invention this sighting hole may also be filled by a light-polarizing film having substantially the same direction of polarization as the film in the other sighting hole.

Figure 1:
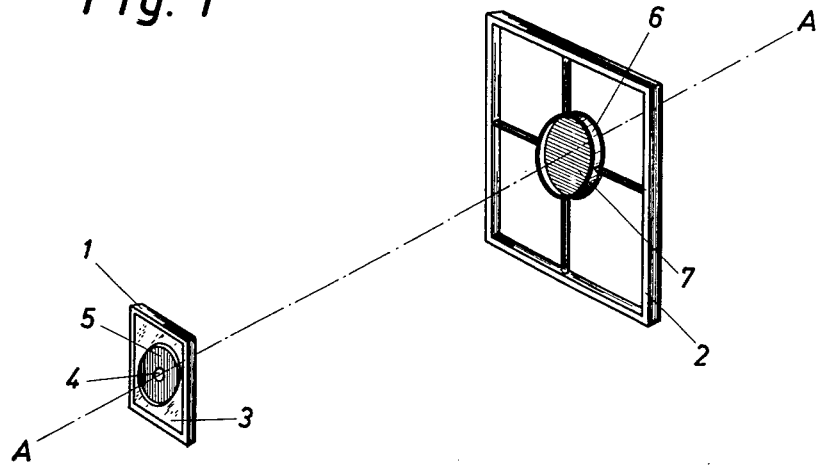
Figure 2:
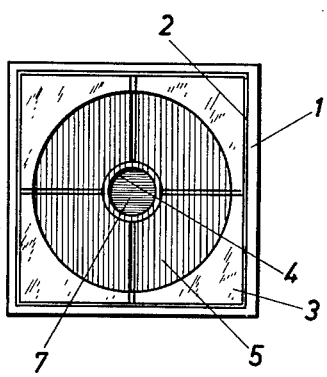
Figure 3:
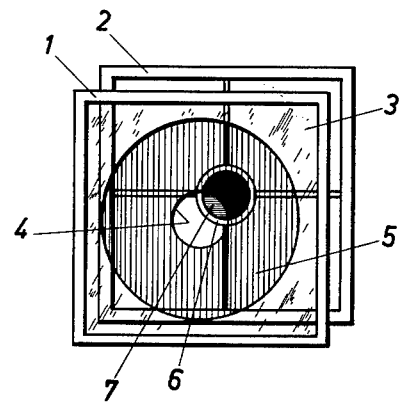

One embodiment of the invention is illustrated in the accompanying drawing in which:

Figure 1 is a diagrammatic perspective view of an aiming device according to the invention, Figure 2 shows diagrammatically how a correct alignment is seen by the eye, and Figure 3 shows how an incorrect alignment is seen by the eye.

In the drawing, numerals 1 and 2 designate two spaced frames which are parallel to each other and disposed at right-angles to the line of sight indicated by A—A in Figure 1. The smaller frame 1 which in use is situated nearer the eye carries a glass plate 3 wherein is set a circular disc 5 of a light-polarizing film provided with a central sighting hole 4. The direction of polarization of the disc 5 may be for instance vertical according to the position shown in the drawing. The larger frame 2 which in use is situated farthest from the eye is provided with a central sighting ring 6 as known per se. Within the ring 6 there is arranged a disc 7 of a light-polarizing film which is disposed with its direction of polarization at right-angles to the direction of polarization of the disc 5 in the frame 1, that is horizontally according to the position shown in the drawing.

In use the aiming device is aligned in known manner so that the sighting hole defined by the ring 6 coincides with the sighting hole 4 as seen by the user (see Figure 2). The field of vision through the hole 4 in the polarized disc 5 situated nearest to the eye will then be covered by the polarizing disc 7 in the sighting ring 6, so that the user will see an even grey surface inside the border of the disc 5. When the aiming device is improperly aligned relative to the eye the films 4 and 7 which are polarized at right-angles to each other will overlap partly or completely causing a dark field adjacent the edge of the sighting hole 4 as shown in Figure 3.

If desired, a light-polarizing film having the same direction of polarization as the film 7 in the sighting ring 6 may be placed in the sighting hole 4.

The invention is not limited to the embodiment hereinbefore described and as shown in the accompanying drawing, said embodiment being susceptible of various modifications without departing from the spirit of the invention. As an example, the sighting hole 4 situated nearest to the eye may be filled by a light-polarizing film whereby a film having a direction of polarization perpendicular thereto would be arranged around the second sighting hole 6.

What I claim is:

An aiming device for cameras and the like comprising a pair of members each having a sighting hole therethrough with the sighting hole of one member being relatively larger than the sighting hole of the other member and facing the objects to be received, said members being fixedly mounted in parallel planes extending at right angles to the line of sight through said sighting holes and spaced apart a given distance whereby said holes appear to coincide to the eye of a viewer sighting through the smaller of said holes from a side thereof opposite to the other of said sighting holes, a light polarizing film extending completely across one of said sighting holes, a second light polarizing film surrounding the other of said sighting holes and having a direction of polarization perpendicular to the direction of polarization of said first-mentioned film whereby said device is in alignment with the objects being viewed when the sighting hole film extending across one of said openings appears to the eye to coincide with the other of said sighting holes and out of alignment when the sighting hole film extending across one of said holes appears to overlap the film surrounding the other of said sighting holes.

References Cited in the file of this patent

UNITED STATES PATENTS

| | | |
|---|---|---|
| 2,079,621 | Land | May 11, 1937 |
| 2,331,667 | Eaton | Oct. 12, 1943 |